No. 658,621. Patented Sept. 25, 1900.
W. C. DALZELL.
AXLE.
(Application filed Aug. 3, 1900.)
(No Model.)
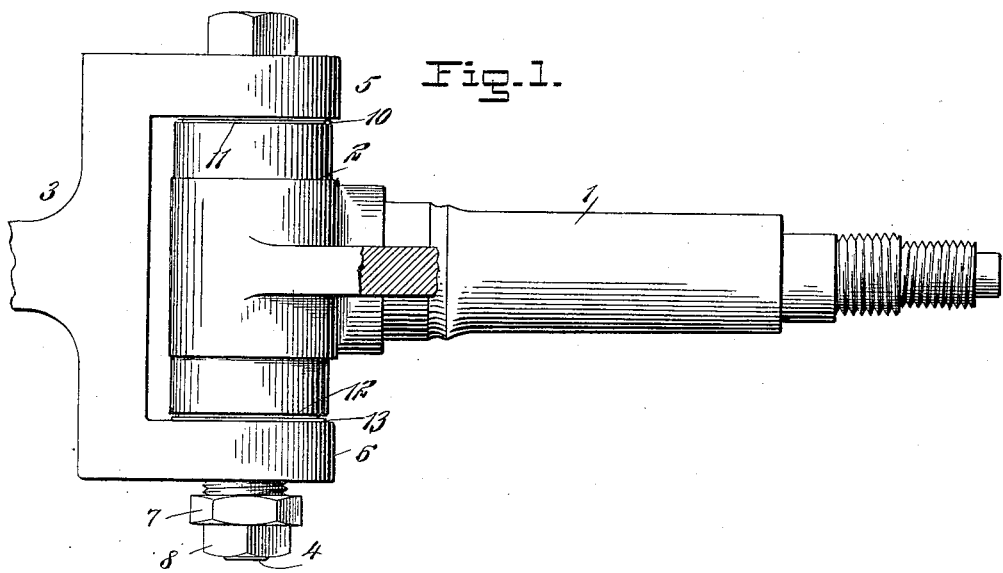
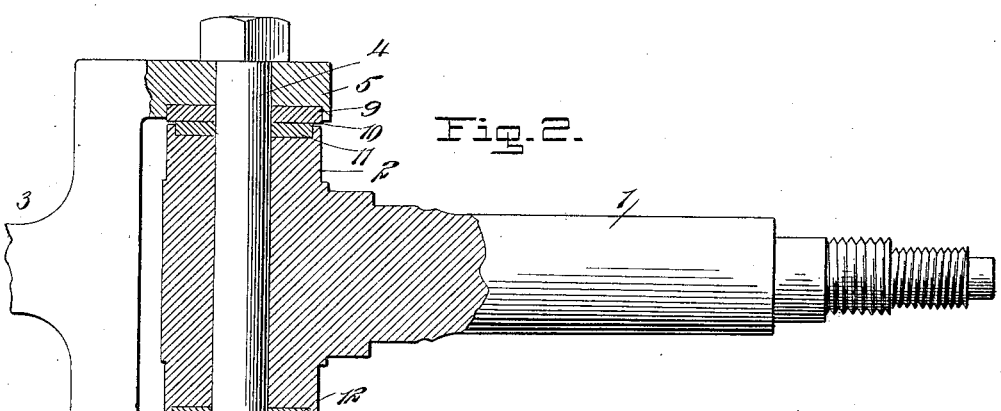
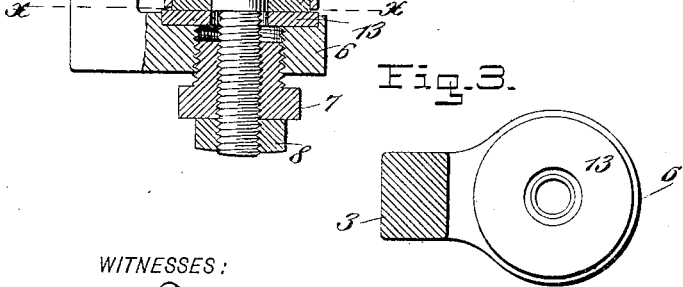
WITNESSES:
James F. Duhamel
C. R. Ferguson
INVENTOR
William C. Dalzell.
BY
ATTORNEYS
THE NORRIS PETERS CO., PHOTO-LITHO., WASHINGTON, D. C.

UNITED STATES PATENT OFFICE.

WILLIAM COX DALZELL, OF EGREMONT, MASSACHUSETTS.

AXLE.

SPECIFICATION forming part of Letters Patent No. 658,621, dated September 25, 1900.

Application filed August 3, 1900. Serial No. 25,789. (No model.)

*To all whom it may concern:*

Be it known that I, WILLIAM COX DALZELL, a citizen of the United States, and a resident of South Egremont, in the county of Berkshire and State of Massachusetts, have invented a new and Improved Axle, of which the following is a full, clear, and exact description.

This invention relates particularly to axles for vehicles in which the wheel-spindle swings on the axle, such as in automobiles; and the object is to provide movable hard-metal bearings with a simple means for adjusting the same as they become worn.

I will describe an axle embodying my invention and then point out the novel features in the appended claims.

Reference is to be had to the accompanying drawings, forming a part of this specification, in which similar characters of reference indicate corresponding parts in all the figures.

Figure 1 is a side elevation of a portion of an axle embodying my invention. Fig. 2 is a sectional side elevation thereof, and Fig. 3 is a section on the line $x\ x$ of Fig. 2.

Referring to the drawings, 1 designates a wheel-spindle having a hub portion 2, mounted to swing relatively to the axle 3. A king-bolt 4 passes through lugs or ears 5 6 on the end of the axle, and the screw-threaded lower end of this king-bolt 4 engages with an interior thread of a nut 7, having an exterior thread engaging in a tapped hole in the ear or lug 6, and on the extreme outer end of the threaded portion of the king-bolt is a lock-nut 8. The under side of the ear or lug 5 is provided with a recess 9, within which a bearing-plate 10, of hardened steel, is removably placed, and engaging with this plate 10 is a hardened-steel bearing-plate 11, seated in a recess in the upper end of the hub 2. A hardened-steel bearing-plate 12 is removably seated in the recess in the lower end of said hub and engages with a hardened-steel bearing-plate 13, removably seated in a recess formed in the inner side of the ear or lug 6, and this bearing-plate 13 is engaged by the nut 7, so that when the several bearing-plates wear the wear may be taken up by screwing the nut 7, thus forcing the plate 13 up against the plate 12, and consequently raising the hub 2 so that the plate 11 will engage closely against the plate 10. The nut 7, therefore, not only serves for adjusting the bearings, but it also serves to hold or receive the king-bolt. Obviously these adjustments may be made when required without removing the wheels of the vehicle or without removing the spindles from the axles, it being only necessary to remove the spindles when new bearing-plates are to be placed in position.

Having thus described my invention, I claim as new and desire to secure by Letters Patent—

1. The combination with an axle and a spindle mounted to swing relatively thereto, of a hub portion for the spindle, hardened-metal bearing-plates seated in recesses in the ends of the spindle, hardened-metal bearing-plates seated in recesses formed in ears or lugs extended from the axle, a king-bolt extended through said ears or lugs and through the hub of the spindle, and a nut with which said king-bolt engages, the said nut also serving to adjust the bearings, substantially as specified.

2. An axle having outwardly-extended ears or lugs, hardened-steel bearing-plates removably seated in recesses in the inner sides of said lugs, a spindle having a hub portion, hardened-steel bearing-plates removably seated in recesses formed in the ends of said hub, a nut having an exterior thread engaging with a threaded opening in the lower ear or lug, a king-bolt passing through the ears or lugs and through the hub and engaging with an interior thread of said nut, and a lock-nut, substantially as specified.

In testimony whereof I have signed my name to this specification in the presence of two subscribing witnesses.

WILLIAM COX DALZELL.

Witnesses:
R. C. TAFT,
CHESTER G. DALZELL.